United States Patent
Yeo (10) Patent No.: US 10,616,676 B2
(45) Date of Patent: Apr. 7, 2020

(54) DYNAMICALLY ADJUSTABLE SIDETONE GENERATION

(71) Applicant: Bose Corporation, Framingham, MA (US)

(72) Inventor: Xiang-Ern Yeo, Cincinnati, OH (US)

(73) Assignee: Bose Corporaton, Framingham, MA (US)

( * ) Notice: Subject to any disclaimer, the term of this patent is extended or adjusted under 35 U.S.C. 154(b) by 0 days.

(21) Appl. No.: 15/943,116

(22) Filed: Apr. 2, 2018

(65) Prior Publication Data

US 2019/0306608 A1    Oct. 3, 2019

(51) Int. Cl.
| | |
|---|---|
| *H04R 1/10* | (2006.01) |
| *G10L 21/034* | (2013.01) |
| *G10L 25/84* | (2013.01) |
| *H04M 1/60* | (2006.01) |
| *H04M 1/58* | (2006.01) |
| *H04R 3/00* | (2006.01) |

(52) U.S. Cl.
CPC .......... *H04R 1/1041* (2013.01); *G10L 21/034* (2013.01); *G10L 25/84* (2013.01); *H04M 1/58* (2013.01); *H04M 1/6016* (2013.01); *H04M 1/6066* (2013.01); *H04R 1/1091* (2013.01); *H04R 1/1016* (2013.01); *H04R 1/1083* (2013.01); *H04R 3/005* (2013.01); *H04R 2201/107* (2013.01); *H04R 2430/01* (2013.01); *H04R 2430/20* (2013.01)

(58) Field of Classification Search
CPC .............................. H04R 1/1041; G10L 21/034
USPC ....................... 381/74, 58, 59, 71.6
See application file for complete search history.

(56) References Cited

U.S. PATENT DOCUMENTS

| | | | | |
|---|---|---|---|---|
| 5,946,391 | A * | 8/1999 | Dragwidge | H04M 1/6008 379/388.02 |
| 6,744,882 | B1 * | 6/2004 | Gupta | H04M 1/6008 379/387.01 |
| 6,850,617 | B1 * | 2/2005 | Weigand | H04M 1/585 379/391 |
| 7,881,927 | B1 * | 2/2011 | Reuss | G10L 25/78 704/226 |
| 8,222,641 | B2 | 7/2012 | Yamkovoy et al. | |

(Continued)

OTHER PUBLICATIONS

International Search Report and Written Opinion in corresponding Application No. PCT/US2019/024880, dated Jun. 28, 2019, pp. 1-12.

*Primary Examiner* — William J Deane, Jr.
(74) *Attorney, Agent, or Firm* — Fish & Richardson P.C.

(57) ABSTRACT

The technology described in this document can be embodied in a method that includes receiving, at one or more processing devices of a headset that includes a sidetone generation circuit, an input signal representing ambient audio, and determining, by the one or more processing devices of the headset, that at least a portion of the input signal represents voice activity that satisfies a threshold condition. The method also includes, responsive to determining that the voice activity in the input signal satisfies the threshold condition, a control signal configured to cause the sidetone generation circuit to generate sidetone signals, and generating, by an acoustic transducer of the headset, an audio signal that represents, at least in part, the sidetone signals generated in accordance with the control signal.

26 Claims, 4 Drawing Sheets

(56) References Cited

U.S. PATENT DOCUMENTS

| | | | |
|---|---|---|---|
| 8,229,105 B2* | 7/2012 | Michaelis | H04M 3/2236 |
| | | | 379/391 |
| 8,363,820 B1* | 1/2013 | Graham | H04M 1/6008 |
| | | | 379/390.02 |
| 8,432,068 B2 | 4/2013 | Yamkovoy | |
| 8,559,619 B2* | 10/2013 | Etter | H04M 1/585 |
| | | | 379/391 |
| 8,666,083 B2 | 3/2014 | Yamkovoy et al. | |
| 8,841,799 B2 | 9/2014 | Yamkovoy et al. | |
| 9,601,128 B2* | 3/2017 | Hu | G10L 21/0208 |
| 9,711,162 B2* | 7/2017 | Murthy | G10L 21/0208 |
| 9,749,731 B2 | 8/2017 | Yeo | |
| 9,965,855 B2 | 5/2018 | Kim | |
| 2003/0228013 A1 | 12/2003 | Etter | |
| 2004/0174989 A1* | 9/2004 | Michaelis | H04M 1/58 |
| | | | 379/391 |
| 2010/0020940 A1* | 1/2010 | Zad-Issa | H04M 1/24 |
| | | | 379/32.01 |
| 2014/0236590 A1* | 8/2014 | Hu | G10L 21/0208 |
| | | | 704/228 |
| 2015/0177365 A1* | 6/2015 | Chabinsky | G01S 7/495 |
| | | | 702/77 |
| 2015/0256660 A1* | 9/2015 | Kaller | H04M 1/585 |
| | | | 379/391 |
| 2015/0334215 A1* | 11/2015 | Zad-Issa | H04M 1/24 |
| | | | 455/418 |
| 2017/0127170 A1* | 5/2017 | Kannappan | H04R 1/1083 |
| 2018/0047410 A1 | 2/2018 | Von Bulow et al. | |

* cited by examiner

DYNAMICALLY ADJUSTABLE SIDETONE GENERATION

TECHNICAL FIELD

This disclosure generally relates to headsets used for communications over a telecommunication system.

BACKGROUND

Headsets used for communicating over telecommunication systems include one or more microphones and speakers. The speaker portion of such a headset can be enclosed in a housing that may cover a portion of one or both ears of the user, thereby interfering with the user's ability to hear his/her own voice during a conversation. This in turn can cause the conversation to sound unnatural to the user, and degrade the quality of user-experience of using the headset.

SUMMARY

In one aspect, this document features a method that includes receiving, at one or more processing devices of a headset that includes a sidetone generation circuit, an input signal representing ambient audio, and determining, by the one or more processing devices of the headset, that at least a portion of the input signal represents voice activity that satisfies a threshold condition. The method also includes, responsive to determining that the voice activity in the input signal satisfies the threshold condition, a control signal configured to cause the sidetone generation circuit to generate sidetone signals, and generating, by an acoustic transducer of the headset, an audio signal that represents, at least in part, the sidetone signals generated in accordance with the control signal.

In another aspect, this document features a headset that includes at least one microphone, a voice activity detection circuit, a sidetone generation circuit, and an acoustic transducer. The voice activity detection circuit includes one or more processing devices, and is configured to receive digitized samples of an input signal representing ambient audio captured by the at least one microphone. The voice activity detection circuit is also configured to determine that at least a portion of the input signal represents voice activity that satisfies a threshold condition, and in response, generate a control signal. The sidetone generation circuit is configured to generate sidetone signals responsive to receiving the control signal, and the acoustic transducer is configured to generate an audio signal that represents, at least in part, the sidetone signals.

In another aspect, this document features or more machine-readable storage devices having encoded thereon computer readable instructions for causing one or more processing devices to perform various operations. The operations include receiving an input signal representing ambient audio, and determining that at least a portion of the input signal represents voice activity that satisfies a threshold condition. The operations also include, responsive to determining that the voice activity in the input signal satisfies the threshold condition, a control signal configured to cause the sidetone generation circuit to generate sidetone signals, and causing an acoustic transducer of the headset to generate an audio signal that represents, at least in part, the sidetone signals generated in accordance with the control signal.

Implementations of the above aspects can include one or more of the following features.

Generating the control signal can include determining that a gain associated with the sidetone generation circuit is below a target level, and in response to determining that the gain associated with the sidetone generation circuit is below the target level, generating the control signal, which is configured to adjust the gain associated with the sidetone generation circuit to a level above the target level. Generating the control signal can include determining that the sidetone generation circuit is deactivated, and in response, generating the control signal, which is configured to activate the sidetone generation circuit. Generating the control signal can include determining that a gain associated with the sidetone generation circuit is larger than a target level, and in response, generating the control signal, which is configured to prevent the gain associated with the sidetone generation circuit from being reduced to a level lower than the target level. Determining that the voice activity in the input signal satisfies the threshold condition can include identifying that the voice activity includes a voice of a user of the headset. Generating the control signal can also include determining an estimated noise level in the ambient audio, and generating the control signal in accordance with the estimated noise level. This can include, for example, accessing a representation of a look-up table that associates multiple noise levels with corresponding gain levels, selecting a particular gain level associated with the estimated noise level in the ambient audio, and generating the control signal, which is configured to adjust the gain associated with the sidetone generation circuit to the particular gain level. The control signal can be configured to cause the sidetone generation circuit to generate sidetone signals in accordance with preset limits. The preset limits can be based on user-input received via a user interface presented on a display device. One or more processing devices of the headset can also be configured to determine that the voice activity in the input signal does not satisfy the threshold condition, and in response, generate a second control signal configured to reduce the gain associated with the sidetone generation circuit. The second control signal can be configured to deactivate the sidetone generation circuit.

In another aspect, this document features a method that includes receiving, at one or more processing devices of a headset that includes a sidetone generation circuit, an input signal representing ambient audio, and estimating a noise level in the ambient audio. The method also includes determining, by the one or more processing devices of the headset, that the noise level of the ambient audio satisfies a threshold condition, and in response, generating a control signal configured to cause the sidetone generation circuit to generate sidetone signals in accordance with a gain level indicated by the control signal. The method further includes generating, by an acoustic transducer of the headset, an audio signal that represents, at least in part, the sidetone signals generated in accordance with the control signal.

In another aspect, this document features a headset that includes at least one microphone, and a noise estimator circuit that includes one or more processing devices. The noise estimator circuit is configured to receive digitized samples of an input signal representing ambient audio captured by the at least one microphone, determine that the noise level of the ambient audio satisfies a threshold condition, and in response, generate a control signal. The headset also includes a sidetone generation circuit configured to generate sidetone signals responsive to receiving the control signal, and in accordance with a gain level indicated by the control signal. The headset further includes an acoustic transducer configured to generate an audio signal that represents, at least in part, the sidetone signals.

In another aspect, this document features or more machine-readable storage devices having encoded thereon computer readable instructions for causing one or more processing devices to perform various operations. The operations include receiving an input signal representing ambient audio captured by microphones of a headset, and estimating a noise level in the ambient audio. The operations also include determining that the noise level of the ambient audio satisfies a threshold condition, and in response, generating a control signal configured to cause the sidetone generation circuit to generate sidetone signals in accordance with a gain level indicated by the control signal. The operations further include causing generation of an audio signal by an acoustic transducer. The audio signal represents, at least in part, the sidetone signals generated in accordance with the control signal.

Implementations of the above aspects can include one or more of the following features.

Generating the control signal can include determining that a gain associated with the sidetone generation circuit is below a target level, and in response, generating the control signal, which is configured to adjust the gain associated with the sidetone generation circuit to a level above the target level. Generating the control signal can include determining that the sidetone generation circuit is deactivated, and, in response, generating the control signal, which is configured to activate the sidetone generation circuit. Generating the control signal also includes determining that a gain associated with the sidetone generation is larger than a target level, and in response, generating the control signal, which is configured to prevent the gain associated with the sidetone generation circuit from being reduced to a level lower than the target level. This can include accessing a representation of a look-up table that associates multiple noise levels with corresponding gain levels, selecting a particular gain level associated with the estimated noise level in the ambient audio, and generating the control signal, which is configured to adjust the gain associated with the sidetone generation circuit to the particular gain level.

Various implementations described herein may provide one or more of the following advantages.

A gain associated with a sidetone generation circuit may be dynamically adjusted to be decreased in high-noise environments, and/or when no voice activity is present, and increased to a higher level upon detection of voice activity. Such dynamic operation of the sidetone generation circuit may in turn significantly improve the listening experience for a user of a headset, for example, by allowing the user to hear her own voice (and/or other voices in the vicinity) while preventing the sidetone generation circuit from generating undesirable artifacts in high-noise environment and/or when no voice activity is present. Also, by allowing for the sidetone generation circuit to be controlled by user-inputs, the versatility of the corresponding headsets may be improved, for example, by making the headsets usable in various environments.

Two or more of the features described in this disclosure, including those described in this summary section, may be combined to form implementations not specifically described herein.

The details of one or more implementations are set forth in the accompanying drawings and the description below.

Other features, objects, and advantages will be apparent from the description and drawings, and from the claims.

DETAILED DESCRIPTION

Sidetone generation is used for providing an audible feedback to a user of a communication headset that interferes with the user's ability to hear ambient sounds naturally. Naturalness of a conversation can be improved, for example, by detecting the user's own voice using a microphone, and playing it back as an audible feedback via a speaker of the communication headset. Such audible feedback is referred to as a sidetone. The term "communication headset" or "headset," as used in this document, includes various acoustic devices where at least a portion of the user's ear (or ears) is covered by the corresponding device, thereby affecting the user's natural ability to hear ambient sounds, including his/her own voice. Such acoustic devices can include, for example, wired or wireless-enabled headsets, headphones, earphones, earbuds, hearing aids, or other in-ear, on-ear, or around-ear acoustic devices. In the absence of a sidetone generator in a headset, a user may not be able to hear ambient sounds, including his/her own voice while speaking, and therefore may find the experience to be unnatural or uncomfortable. This in turn can degrade the user experience associated with using headsets for conversations or announcements.

A sidetone generator may be used in a communication headset to restore, at least partially, the natural acoustic feeling of a conversation. A sidetone generator can be used, for example, to provide to the user, through a speaker, acoustic feedback based on the user's own voice captured by a microphone. This may allow the user to hear his/her own voice even when the user's ear is at least partially covered by the headset, thereby making the conversation sound more natural to the user.

In some cases though, a sidetone may include undesirable artifacts that could potentially degrade the user-experience rather than making the experience sound natural. For example, in the presence of a high level of ambient noise (e.g., constant wideband noise), a sidetone signal may cause a user to perceive such noise more prominently, thereby degrading the overall user-experience. Examples of constant wideband noise includes noise emanating from a HVAC system of a building, noise from vehicular traffic in the vicinity, or babble noise at a public place such as a coffee shop. When using the headset at locations with a high level of constant wideband noise, a user may prefer to avoid hearing a sidetone signal altogether, or prefer a low gain to be associated with the sidetone signal. However, the user may not prefer to make such gain adjustments manually. In addition, such manual adjustments would require a control interface, such as a knob or button on the headset, which could be difficult to implement in the small form factor of a headset. One solution for improving the sidetone in high noise environments could be to perform noise-reduction operations on the generated sidetone. However, because sidetones are generated to allow a user to hear his/her own voice, sophisticated noise cancellation operations on a sidetone signal may introduce unacceptable latencies in some cases.

In some cases, a sidetone signal may generate undesirable artifacts even in the absence of wideband noise. For example, high frequency noise resulting from noise spikes or impulses can also affect sidetones and thereby degrade user-experience. Examples of such impulse noise include dropping of a metal object, noise caused by shuffling of papers, or noise caused by a metallic foil type material. A sidetone generation circuit can cause such noise to be amplified and piped in to both ears of a user. This can result in the user not being able to adequately perceive the direction from which the noise emanates, and due to potential psychoacoustic effects on the user, the amplified impulse noise included in the sidetone signal for both ears can cause the noise to appear to be louder than the noise actually is.

The technology described herein provides a sidetone generation circuit that can be automatically adjusted based on the output of a voice activity detector (VAD) and/or a noise level estimator. The adjustments may be made substantially without any real-time input from the user. In some implementations, this allows for the sidetone generation circuit to be automatically disabled (or adjusted to a low-gain state) when no voice activity is detected and/or the wideband noise in the ambient is above a threshold level. In some cases, by automatically reducing the gain of the sidetone generation circuit or disabling it when not needed, the technology described herein may reduce the chances of impulse noise spikes degrading the user-experience associated with sidetones. Further, by using an estimate of the wideband ambient noise to control the gain of the sidetone generation circuit, the subject technology may prevent a high level of ambient noise from degrading the user-experience. In some cases, this can also improve battery life by reducing the amount of time a sidetone generation circuit operates at a high gain level.

Figure 1:
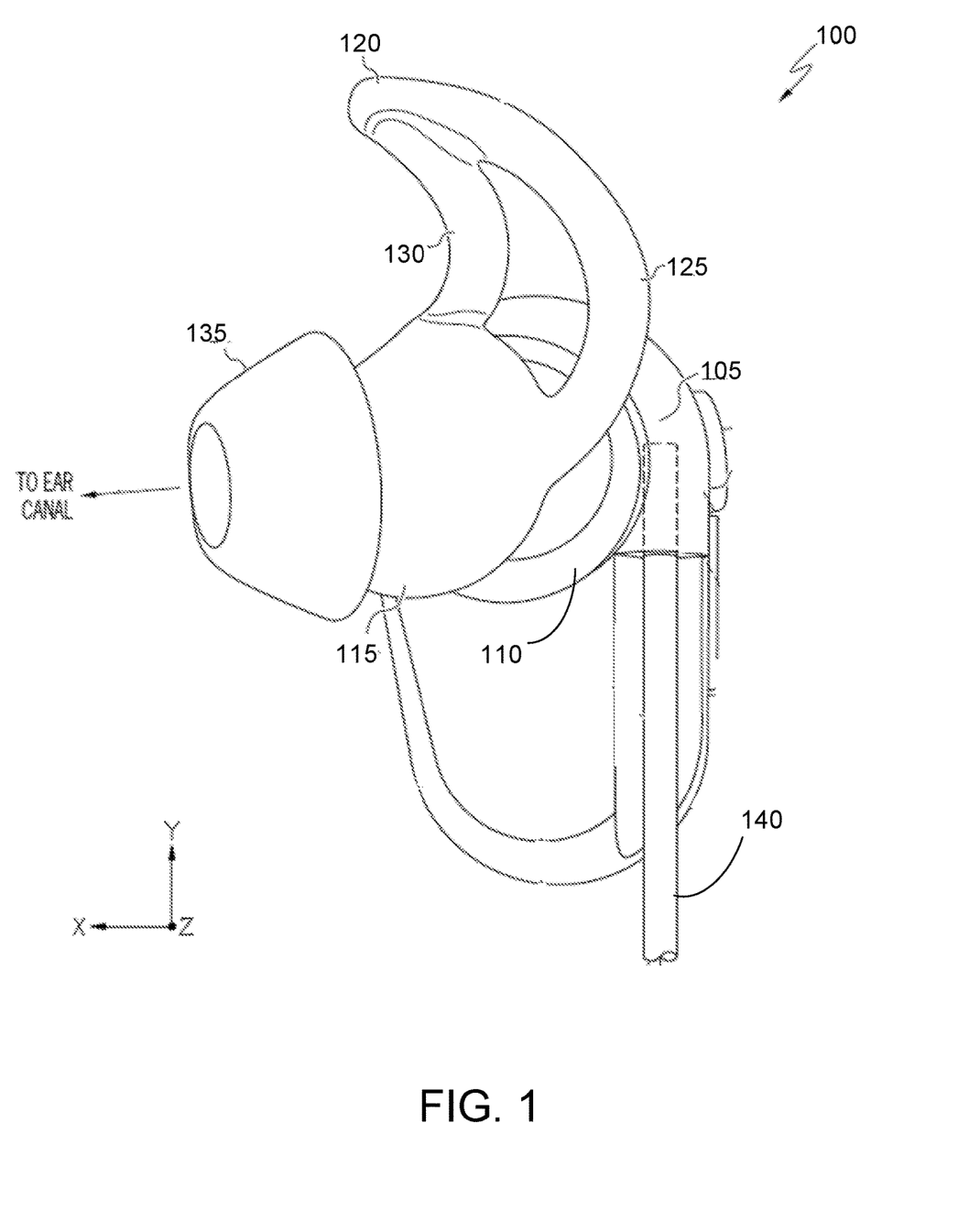
FIG. 1 is an example of a headset that includes a sidetone generation circuit.

FIG. 1 shows an example of a headset 100. While an in-ear headset is shown in the example, other acoustic devices such as wired or wireless-enabled headsets, headphones, earphones, earbuds, hearing aids, or other in-ear, on-ear, or around-ear acoustic devices are also within the scope of the technology described herein. The example headset 100 includes an electronics module 105, an acoustic driver module 110, and an ear interface 115 that fits into the wearer's ear to retain the headset and couple the acoustic output of the driver module 110 to the user's ear canal. In the example headset of FIG. 1, the ear interface 115 includes an extension 120 that fits into the upper part of the wearer's concha to help retain the headset. In some implementations, the extension 120 can include an outer arm or loop 125 and an inner arm or loop 130 configured to allow the extension 120 to engage with the concha. In some implementations, the ear interface 115 may also include an ear-tip 135 for forming a sealing configuration between the ear interface and the opening of the ear canal of the user.

In some implementations, the headset 100 can be configured to connect to another device such as a phone, media player, or transceiver device via one or more connecting wires or cables (e.g., the cable 140 shown in FIG. 1). In some implementations, the headset may be wireless, e.g., there may be no wire or cable that mechanically or electronically couples the earpiece to any other device. In such cases, the headset can include a wireless transceiver module capable of communicating with another device such as a mobile phone or transceiver device using, for example, a media access control (MAC) protocol such as Bluetooth®, IEEE 802.11, or another local area network (LAN) or personal area network (PAN) protocol.

In some implementations, the headset 100 includes one or more microphones that capture the voice of a user and/or other ambient acoustic components such as noise, and produce corresponding electronic input signals. The headset 100 can also include circuitry for processing the input signals for subsequent transmission out of the headset, and for generating sidetone signals based on the input signals.

Figure 2:
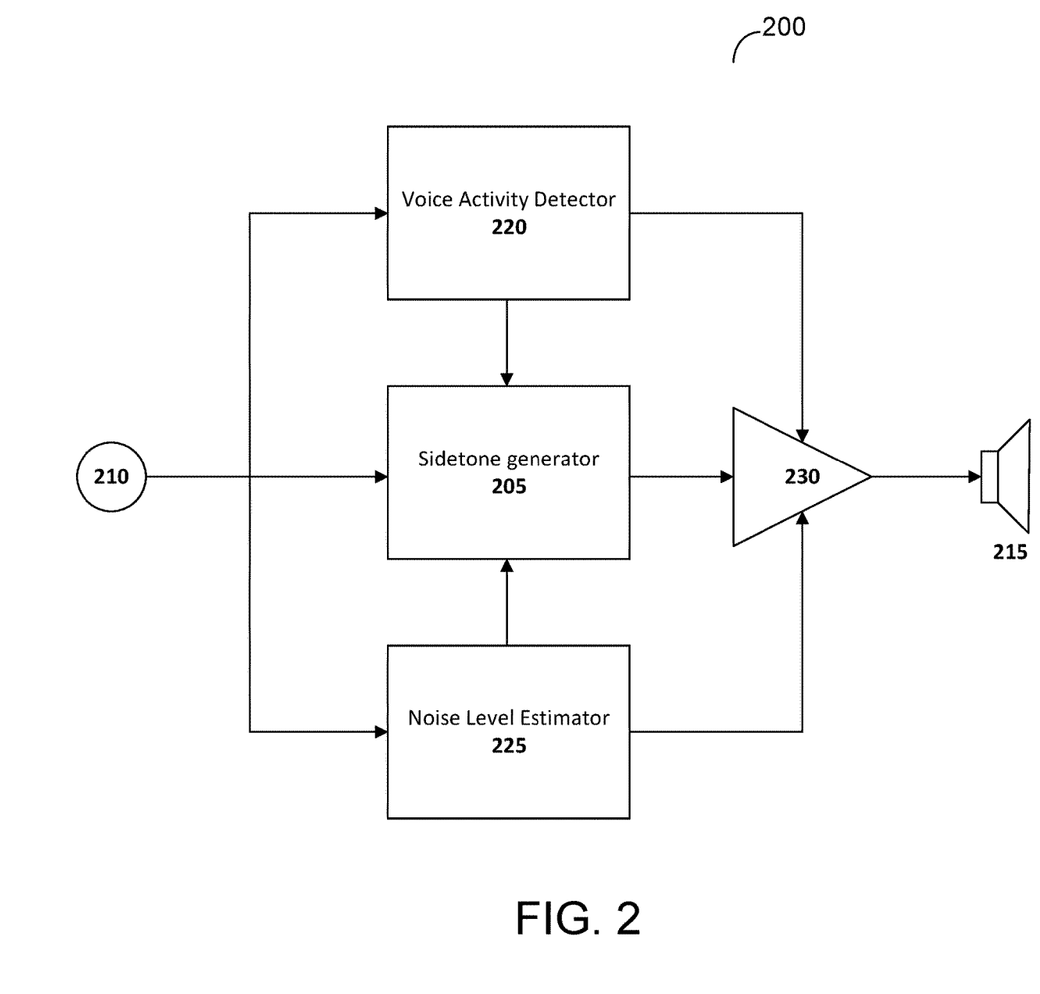
FIG. 2 is a block diagram of an example of circuitry associated with a headset that includes a sidetone generation circuit implemented in accordance with technology described herein.

FIG. 2 is a block diagram of circuitry 200 associated with a headset that includes a sidetone generation circuit in accordance with one implementation of the technology described herein. In some implementations, the circuitry 200 includes a sidetone generator 205 that generates a sidetone based on input signals provided by a microphone 210. Even though the example of FIG. 2 shows a single microphone 210, two or more microphones may also be used without deviating from the scope of the technology described herein. The sidetone signals generated by the sidetone generator 205 may be used to produce acoustic feedback via one or more acoustic transducers or speakers 215.

In some implementations, the operation of the sidetone generator 205 can be dynamically affected by a voice activity detector (VAD) 220 and/or a noise level estimator (NLE) 225. Such modules can be configured to affect the operation of the sidetone generator 205 in various ways. In some implementations, the VAD 220 and/or the NLE 225 can be configured to communicate one or more control signals to the sidetone generator 205 to enable/disable the sidetone generator 205. In some implementations, the VAD 220 and/or the NLE 225 can be configured to generate one or more control signals that adjust the gain of an output of the sidetone generator 205. For example, the one or more control signals generated by the VAD 220 and/or the NLE 225 can be configured to adjust a variable gain amplifier (VGA) 230 controlling the output of the sidetone generator 205.

The NLE 225 can be used, for example, to adjust sidetone gain, or even potentially disable the sidetone generator 205 if the ambient noise is above a threshold level. In some implementations, the NLE 225 can be configured to estimate the level of wideband noise in audio signal captured by the microphone 210, and generate one or more control signals to adjust the gain of the VGA 230 and/or enable/disable the sidetone generator 205 in accordance with the estimated gain level. For example, the NLE 225 can be configured to access a storage device that stores sidetone gain levels usable for multiple corresponding levels of ambient noise, for example, in a look-up table representation. In some implementations, the level of wideband noise in the audio signal can be estimated by estimating the root mean square (RMS) value of a filtered signal (e.g., a-weighted) with a time constant, and then applying a calibration constant to estimate the noise in dBSPL. In some implementations, the gain levels corresponding to the different levels of ambient noise can be determined, for example, empirically, and/or based on user-inputs. For example, the user-input may specify gain limits for different levels of noise, and the NLE 225 may be configured to fine-tune the gain adjustments within such preset limits. The user-input may be received, for example, via a user interface presented on a display device of a phone or other device connected to the headset.

The NLE can be configured to access such a representation of a look-up table, select a particular gain level associated with the estimated noise level, and generate a control signal that adjusts the gain of the VGA 230 to the particular gain level. In some implementations, the NLE 225 can be configured to disable the sidetone generator 205 if the ambient noise level is higher than a threshold. The NLE 225 can also be configured to enable the sidetone generator 205 responsive to determining that the ambient noise level is lower than the threshold. The types of noise that may be estimated by the NLE 225 include, for example, white noise such as noise produced by a HVAC system, babble noise such as background noise present in a coffee shop or other public places, wind noise, traffic noise, etc.

In some cases, sidetones may be affected by artifacts produced by non-wideband noise such as transient high frequency noise. Transient high frequency noise may be problematic due to attendant psychoacoustic effects on the user of the headset, and the way such headsets process the noise. For example, the magnitude and frequency characteristics of a high-frequency noise spike may be perceived differently at the two ears, depending on, for example, the direction from which the noise emanates. Further, when a user is wearing a headset, the user expects such noise to be attenuated due to the passive attenuation provided by the headset. In the absence of the subject technology, such noise spikes may be amplified by the sidetone generator 205, and piped or played through the acoustic transducers 215 at each ear with substantially equal volume. This may cause the noise to be perceived by the user at a level louder than he/she would have perceived it in the absence of the sidetone generator. Therefore, in some cases, a sidetone generator that does not use the subject technology may degrade the user-experience significantly, particularly when the user is not speaking and instead is trying to focus on far-end users' voices being played through the acoustic transducers of the headset.

In some implementations, the VAD 220 can be configured to adjust the VGA 230 such that the gain associated with the generated sidetone is maintained at a low level in the absence of detected speech. The VAD 220 is also configured to adjust the VGA 230 to a high gain level responsive to detecting speech by the user of the headset and/or speech in the vicinity of the user of the headset. For example, if the user of the headset is the lone participant in a teleconference, the VAD 220 can be configured to adjust the gain of the VGA 230 based on detecting (or not detecting) speech of the user. In another example, if there are multiple participants in the same teleconference near the user, the VAD 220 can be configured to adjust the gain of the VGA 230 based on detecting (or not detecting) speech of the user, or generally speech emanating from sources in the vicinity of the user. In some implementations, the VAD 220 may be configured to identify the voice of the particular user of the headset (e.g., via a learning process on frequency and/or magnitude characteristics of the user's voice) and configured to generate control signals responsive to detecting the voice of the particular user. This can also be used, for example, to personalize the sidetone generation for different users, for example, by allowing for user-preferences to control aspects of the sidetone generation process. In some implementations, adjustments to the sidetone gain may substantially reduce artifacts associated with transient high-frequency noise by preventing amplification of such noise during periods when no speech is detected.

In some implementations, the VAD 220 can include one or more processing devices configured to execute a voice activity detection process on input audio data received from the microphone 210. In some implementation, a voice activity detection process can be used to identify if there is human speech present in the input audio data, and generate a discrete flag that indicates the presence of such speech. The VAD 220 can be configured to generate the one or more control signals (e.g., for controlling the VGA 230 or enabling/disabling the sidetone generator 205) in accordance with the presence or absence of the flag. In some implementations, the VAD 220 can be configured to compute a score indicative of a probability of human speech being present in the input audio data, and the one or more control signals can be generated based on such a score. For example, if the score (also referred to as a soft-VAD score) indicates that the probability of speech being present satisfies a threshold condition, the one or more control signal can be accordingly generated to adjust the VGA 230. Various types of voice activity detection processes may be used in computing such soft-VAD scores. One example of such a process is described in the reference: Huang, Liang-sheng and Chung-ho Yang. "A novel approach to robust speech endpoint detection in car environments." *Acoustics, Speech, and Signal Processing*, 2000. *ICASSP '00. Proceedings.* 2000 *IEEE International Conference on.* Vol. 3. IEEE, 2000, the entire content of which is incorporated herein by reference.

Figure 3:
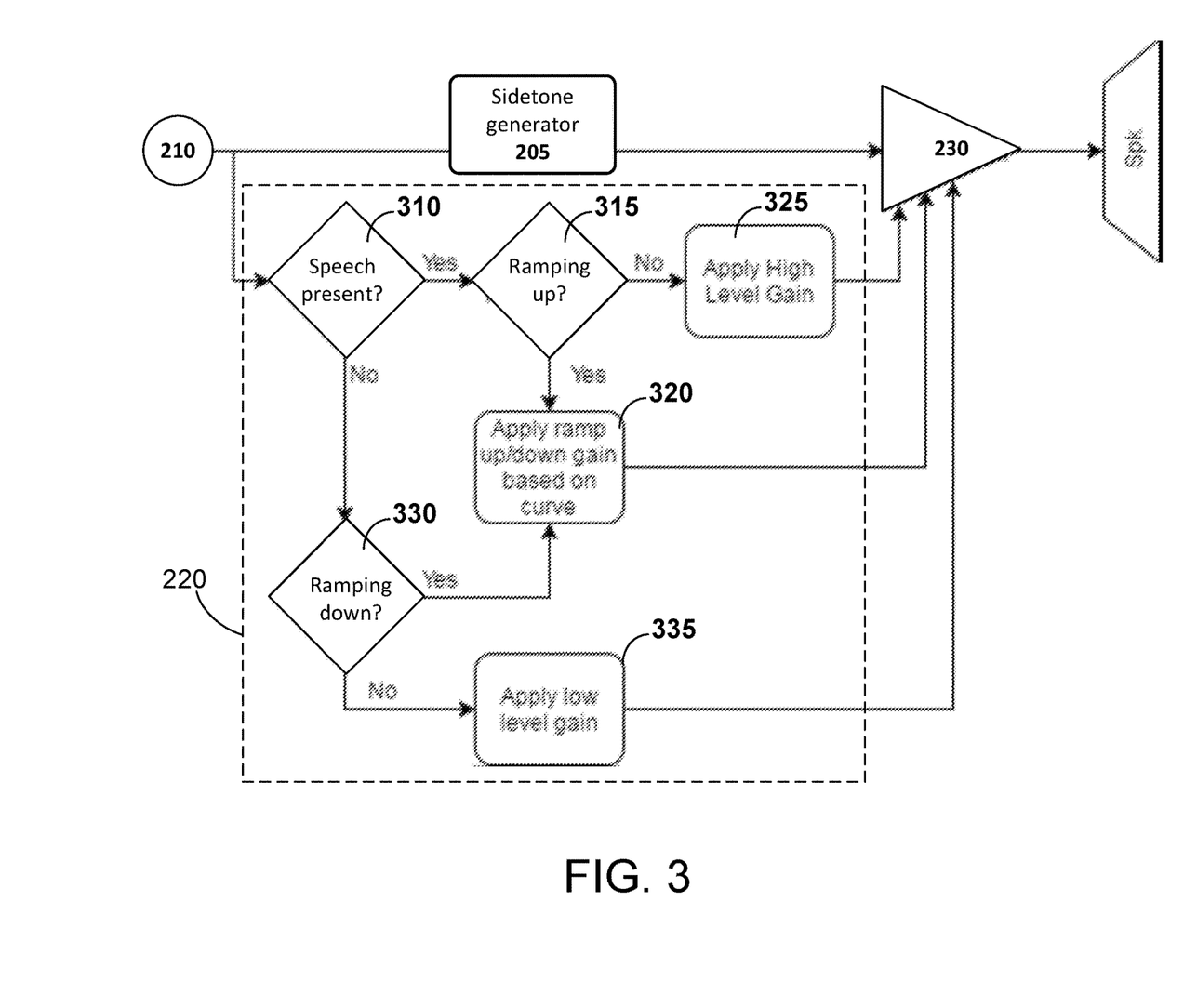
FIG. 3 is a schematic diagram illustrating the process of adjusting the gain associated with a sidetone in accordance with the output of a voice activity detector (VAD).

FIG. 3 is a schematic diagram illustrating the process of adjusting the gain associated with a sidetone in accordance with the output of the VAD 220. In some implementations, the VAD 220 processes the input audio data received from the microphone 210 to determine if speech is present in the input audio data (310). The determination can be done, for example, using a voice activity detection process such the ones described above. Based on the determination, the gain of the VGA 230 may be adjusted. When the gain level of the VGA 230 is adjusted between two or more levels (e.g., a high level representing a high gain for the sidetone and a low level representing a low gain for the sidetone), the switching may not be instantaneous, for example, due to characteristics of the associated circuit. Rather, the gain level of the VGA 230 may be ramped up or down between the two or more levels over a period of time (e.g., 500-1000 ms).

If a determination is made that speech is indeed present in the input audio data (e.g., as may be indicated by a flag being set through the voice activity detection process), the VAD 220 can be configured to determine whether the gain level of the VGA 230 is being ramped up (315). If it is determined that the gain of the VGA 230 is already being ramped up, the process can be continued (e.g., in accordance with the curve representing the ramp-up) until the target gain level associated with speech activity is reached (320). Conversely, if it is determined that the gain of the VGA 230 is not being ramped up and the current gain of the VGA 230 is below the target gain level associated with speech activity, the VAD 220 can be configured to generate a control signal that applies the target level to the VGA (325). In some implementations, this can include, for example, reversing or stopping a ramping down process, and initiating a ramp-up process to set the gain level to the target gain level associated with speech activity. In some implementations, this can also include allowing a ramp-down process to reach the destination level before initiating the ramp-up process. In some implementations, if the current gain level of the VGA 230 is already at the target level, the VAD 220 can be configured to maintain the current gain level.

If the determination 315 indicates that that speech is not present in the input audio data, the VAD 220 can be configured to determine whether the gain level of the VGA 230 is being ramped down (330). If it is determined that the gain of the VGA 230 is already being ramped down, the process can be continued (e.g., in accordance with the curve representing the ramp-down) until the target gain level associated with the absence of speech activity is reached (320). Conversely, if it is determined that the gain of the VGA 230 is not being ramped down and the current gain of the VGA 230 is above the target gain level associated with the absence of speech activity, the VAD 220 can be configured to generate a control signal that applies the corresponding target level to the VGA (335). In some implementations, this can include, for example, reversing or stopping a ramping-up process, and initiating a ramp-down process to set the gain level to the target gain level associated with the absence of speech activity. In some implementations, this can also include allowing a ramp-up process to reach the destination level before initiating the ramp-down process. In some implementations, if the current gain level of the VGA 230 is already at the target level associated with an absence of speech activity, the VAD 220 can be configured to maintain the current gain level.

In some implementations, the control signals from the VAD 220 and the NLE 225 may be weighted to control the gain associated with the sidetone generated by the sidetone generator 205. For example, if an output of the NLE 225 indicates that the ambient noise level is higher than a threshold level, the sidetone generator 205 may be operated at a low gain level (or deactivated) even if an output of the VAD 220 indicates the presence of speech activity. In some implementations, the sidetone generator 205 may be deactivated based on user-input that overrides the control signals. For example, the headset or a corresponding connected device (e.g., a phone) may include a control that allows the user to mute the microphone. The sidetone generator 205 may be deactivated automatically upon activation of such a control by the user.

Referring back to FIG. 2, the sidetone generator 205 and/or the circuitry 200 in general can include one or more different components. For example, the circuitry 200 may include one or more analog to digital converters (ADC) that digitize the analog signals captured by the microphone 210. In some implementations, the circuitry 200 can include a sample rate converter that converts the sample rate of the digitized signals to an appropriate rate. In some implementations, outputs of the sample rate converter can be provided to circuitry within the sidetone generator 205, where such samples are processed to generate the sidetone signals.

In some implementations, the sidetone generator 205 can be configured to use various types of processing in generating the sidetone signal. For example, the sidetone generator can include one or more of: a beamformer, a microphone mixer, and an equalizer. If two or more microphones 210 are present, the beamformer can be configured to combine signals from the microphones to facilitate directional reception. This can be done, for example, using a time-domain beamforming technique such as delay-and-sum beamforming. In other implementations, frequency domain techniques such as a minimum variance distortionless response (MVDR) beamformer may be used. In some implementations, a mixer can be configured to combine the signals, for example, to increase (e.g., to maximize) the signal to noise ratio in the output signal. In some implementations, the output of the mixer can be provided to an equalizer, which applies an equalization process on the mixer output to generate the output sidetone signal. The equalization process can be configured to shape the sidetone signal such that any acoustic feedback generated based on the sidetone signal sounds natural to the user of the headset. In some implementations, the sidetone signal can be mixed in with the incoming signal, and played back through the acoustic transducer or speaker 215 of the headset.

Figure 4:
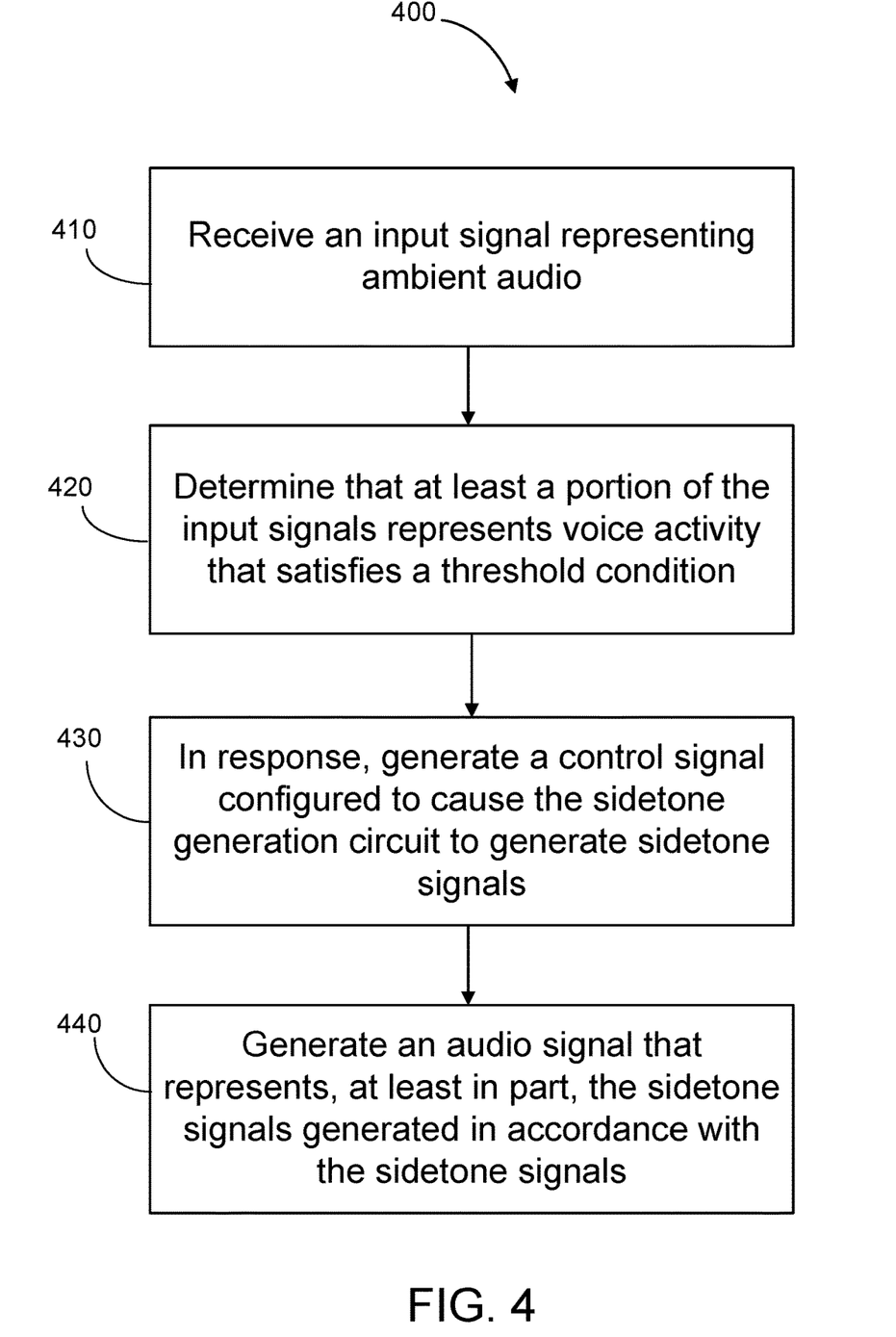
FIG. 4 is a flowchart of an example process for generating an audio signal that includes a sidetone.

FIG. 4 is a flow chart of an example process 400 for generating a sidetone signal. In some implementations, at least a portion of the process 400 can be executed on a headset, for example, in cooperation between the sidetone generator 205 and the VAD 220 described above with reference to FIG. 2. For example, one or more processing devices associated with the VAD 220 can be used to detect the presence or absence of voice activity, whereas one or more processing devices associated with the sidetone generator 205 can be used to generate a sidetone signal in accordance with an input received from the VAD 220. Operations of the process 400 can include receiving an input signal representing ambient audio (410). In some implementations, the input signal can include digitized audio data generated from audio captured using the microphone 210.

Operations of the process 400 further include determining that at least a portion of the input signal represents voice activity that satisfies a threshold condition (420). In some implementations, the input signal may be processed at a VAD 220, which generates an output (e.g. a flag) indicative of speech activity being present in the input signal. In some implementations, the threshold condition may be associated with the voice activity of the user of the headset. For example, the headset can be configured to learn the particular user's voice, and the threshold condition may be deemed to be satisfied if the particular user's voice is detected among speech activity of multiple users. A particular user's voice may be learnt, for example, based on frequency and/or magnitude characteristics of that user's voice. In some implementations, satisfying the threshold condition may constitute a determination that adequate speech activity is not present in the input signal. In such cases, the VAD 220 can be configured to generate an output indicative of an absence of adequate speech activity.

Operations of the process 400 also include generating, responsive to determining that the voice activity in the input signal satisfies the threshold condition, a control signal configured to cause the sidetone generation circuit to generate sidetone signals (430). In some implementations, this can include determining that a gain associated with the sidetone generation circuit is below our target level, and in response to such determination, generating the control signal which adjusts the gain to a level above the target level. For example, if the gain associated with the sidetone generation circuit is originally at a low level, the gain may be set to a higher level upon detection of speech activity. In some implementations, the sidetone generation circuit may initially be in a deactivated condition, and in response to detecting speech activity in the input signal, the VAD 220 may generate a control signal that's configured to activate/reactivate the sidetone generation circuit.

In some implementations, where satisfying the threshold condition constitutes detecting an absence of adequate speech activity in the input signal, the control signal can be configured to reduce the gain associated with the sidetone, or deactivate the sidetone generation circuit. For example, generating the control signal can include determining that a gain associated with the sidetone generation circuit is larger than a corresponding target level, and in response, generating a control signal configured to reduce the gain to the corresponding target level. In some implementations, generating the control signal can include determining that a gain associated with the sidetone generation circuit is larger than a target level, and in response, generating a control signal that is configured to prevent the gain from being reduced to a level lower than the target level. For example, if absence of voice activity is detected during a period when the gain is in a transient state of already being ramped down to a low level, the control signal may be configured to maintain the gain at the low level once that level is reached.

In some implementations, the control signal is generated in accordance with an estimated noise level in the ambient audio. For example, generating the control signal can include determining an estimated noise level in the ambient audio, and generating the control signal in accordance with the estimated noise level. This may be done, for example, by accessing a representation of a lookup table that associates multiple noise levels with corresponding gain levels, and selecting a particular gain level associated with the estimated noise level. The control signal can then be generated such that the gain associated with the sidetone generation circuit is adjusted to the particular gain level. In some implementations, generating the sidetone signal in accordance with the estimated noise level can be independent of adjustments based on voice activity detection.

Operations of the process 400 also include generating an audio signal that represents, at least in part, the sidetone signals generated in accordance with the control signal (440). The audio signal can be generated by an acoustic transducer or speaker of the headset, and combined with other audio signals (e.g. audio signals representing voices of speakers at a far end of a teleconference) being played back through the acoustic transducer.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a DSP, a microcontroller, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed one or more processing devices at one site or distributed across multiple sites and interconnected by a network.

Actions associated with implementing all or part of the functions can be performed by one or more programmable processors or processing devices executing one or more computer programs to perform the functions of the processes described herein. All or part of the functions can be implemented as, special purpose logic circuitry, e.g., an FPGA and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

A number of implementations have been described. However, other embodiments not specifically described in details are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein. While the technology has been particularly shown and described with references to preferred embodiments thereof, it will be understood by those skilled in the art that various changes in form and details may be made therein without departing from the spirit and scope of the appended claims.

What is claimed is:

1. A method comprising:
    receiving, at one or more processing devices of a headset that includes a sidetone generation circuit, an input signal representing ambient audio;
    determining, by the one or more processing devices of the headset, if a probability of a presence of voice activity in at least a portion of the input signal exceeds a single threshold level;
    responsive to determining that the probability of the presence of voice activity exceeds the single threshold level, generating a first control signal configured to cause the sidetone generation circuit to generate sidetone signals at or above a first target gain level;
    responsive to determining that the probability of the presence of voice activity does not exceed the single threshold level, generating a second control signal configured to cause the sidetone generation circuit to generate sidetone signals at or below a second target gain level; and
    generating, by an acoustic transducer of the headset, an audio signal that represents, at least in part, the sidetone signals generated in accordance with the first control signal or the second control signal.

2. The method of claim 1, wherein generating the first control signal further comprises:
    determining that a gain associated with the sidetone generation circuit is below the first target gain level; and
    in response to determining that the gain associated with the sidetone generation circuit is below the first target gain level, generating the first control signal, which is configured to adjust the gain associated with the sidetone generation circuit to a level above the first target gain level.

3. The method of claim 1, wherein generating the first control signal further comprises:
    determining that the sidetone generation circuit is deactivated; and
    in response to determining that the sidetone generation circuit is deactivated, generating the first control signal, which is configured to activate the sidetone generation circuit.

4. The method of claim 1, wherein generating the first control signal further comprises:
    determining that a gain associated with the sidetone generation circuit is larger than the first target gain level; and
    in response to determining that the gain associated with the sidetone generation is larger than the first target gain level, generating the first control signal, which is configured to prevent the gain associated with the sidetone generation circuit from being reduced to a level lower than the first target gain level.

5. The method of claim 1, wherein determining if the probability of a presence of voice activity in at least a portion of the input signal exceeds the single threshold level comprises identifying, by the one or more processing devices, that the voice activity includes a voice of a user of the headset.

6. The method of claim 1, wherein generating the first control signal further comprises:
determining an estimated noise level in the ambient audio; and
generating the first control signal in accordance with the estimated noise level.

7. The method of claim 6, further comprising:
accessing a representation of a look-up table that associates multiple noise levels with corresponding gain levels;
selecting a particular gain level associated with the estimated noise level in the ambient audio;
adjusting the first target gain level to the particular gain level; and
generating the first control signal, which is configured to adjust a gain associated with the sidetone generation circuit to the particular gain level.

8. The method of claim 1, wherein the first control signal is configured to cause the sidetone generation circuit to generate sidetone signals in accordance with preset limits.

9. The method of claim 8, wherein the preset limits are based on user-input received via a user interface presented on a display device.

10. The method of claim 1, wherein the second control signal is configured to deactivate the sidetone generation circuit.

11. The method of claim 1, wherein generating the second control signal comprises:
determining that a gain associated with the sidetone generation circuit is above the second target gain level; and
in response to determining that the gain associated with the sidetone generation circuit is above the second target gain level, generating the second control signal, which is configured to adjust the gain associated with the sidetone generation circuit to the second target gain level.

12. The method of claim 1, wherein generating the second control signal further comprises:
determining that the sidetone generation circuit is activated; and
in response to determining that the sidetone generation circuit is activated, generating the second control signal, which is configured to deactivate the sidetone generation circuit.

13. The method of claim 1, wherein generating the second control signal further comprises:
determining that a gain associated with the sidetone generation circuit is lower than the second target gain level; and
in response to determining that the gain associated with the sidetone generation is lower than the second target gain level, generating the second control signal, which is configured to prevent the gain associated with the sidetone generation circuit from being increased to a level higher than the second target gain level.

14. A headset comprising:
at least one microphone;
a voice activity detection circuit comprising one or more processing devices, the voice activity detection circuit configured to:
receive digitized samples of an input signal representing ambient audio captured by the at least one microphone,
determine if a probability of a presence of voice activity in at least a portion of the input signal exceeds a single threshold level,
responsive to determining that the probability of the presence of voice activity exceeds the single threshold level, generate a first control signal, and
responsive to determining that the probability of the presence of voice activity does not exceed the single threshold level, generate a second control signal;
a sidetone generation circuit configured to generate sidetone signals responsive to receiving the first control signal or the second control signal,
wherein receiving the first control signal causes the sidetone generation circuit to generate sidetone signals at or above a first target gain level, and
wherein receiving the second control signal causes the sidetone generation circuit to generate sidetone signals at or below a second target gain level; and
an acoustic transducer configured to generate an audio signal that represents, at least in part, the sidetone signals in accordance with the first control signal or the second control signal.

15. The headset of claim 14, wherein generating the first control signal further comprises:
determining that a gain associated with the sidetone generation circuit is below the first target gain level; and
in response to determining that the gain associated with the sidetone generation circuit is below the first target gain level, generating the first control signal, which is configured to adjust the gain associated with the sidetone generation circuit to a level above the first target gain level.

16. The headset of claim 14, wherein generating the first control signal further comprises:
determining that the sidetone generation circuit is deactivated; and
in response to determining that the sidetone generation circuit is deactivated, generating the first control signal, which is configured to activate the sidetone generation circuit.

17. The headset of claim 14, wherein generating the first control signal further comprises:
determining that a gain associated with the sidetone generation circuit is larger than the first target gain level; and
in response to determining that the gain associated with the sidetone generation circuit is larger than the first target gain level, generating the first control signal, which is configured to prevent the gain associated with the sidetone generation circuit from being reduced to a level lower than the first target gain level.

18. The headset of claim 14, wherein determining if the probability of a presence of voice activity in at least a portion of the input signal exceeds the single threshold level comprises identifying, by the one or more processing devices, that the voice activity includes a voice of a user of the headset.

19. The headset of claim 14, further comprising:
a noise level estimator configured to:
determine an estimated noise level in the ambient audio, and
generate the first control signal in accordance with the estimated noise level.

20. The headset of claim 19, wherein the noise level estimator is configured to:
  access a representation of a look-up table that associates multiple noise levels with corresponding gain levels;
  select a particular gain level associated with the estimated noise level in the ambient audio;
  adjust the first target gain level to the particular gain level; and
  generate the first control signal, which is configured to adjust a gain associated with the sidetone generation circuit to the particular gain level.

21. The headset of claim 14, wherein the sidetone generation circuit is configured to generate sidetone signals in accordance with preset limits.

22. The headset of claim 21, wherein the preset limits are based on user-input received via a user interface presented on a display device.

23. The headset of claim 14, wherein the second control signal is configured to deactivate the sidetone generation circuit.

24. The headset of claim 14, wherein generating the second control signal further comprises:
  determining that a gain associated with the sidetone generation circuit is above the second target gain level; and
  in response to determining that the gain associated with the sidetone generation circuit is above the second target gain level, generating the second control signal, which is configured to adjust the gain associated with the sidetone generation circuit to the second target gain level.

25. The headset of claim 14, wherein generating the second control signal further comprises:
  determining that the sidetone generation circuit is activated; and
  in response to determining that the sidetone generation circuit is activated, generating the second control signal, which is configured to deactivate the sidetone generation circuit.

26. The headset of claim 14, wherein generating the second control signal further comprises:
  determining that a gain associated with the sidetone generation circuit is lower than the second target gain level; and
  in response to determining that the gain associated with the sidetone generation circuit is lower than the second target gain level, generating the second control signal, which is configured to prevent the gain associated with the sidetone generation circuit from being increased to a level higher than the first target gain level.

* * * * *

UNITED STATES PATENT AND TRADEMARK OFFICE
CERTIFICATE OF CORRECTION

PATENT NO. : 10,616,676 B2  
APPLICATION NO. : 15/943116  
DATED : April 7, 2020  
INVENTOR(S) : Xiang-Ern Yeo Page 1 of 1

It is certified that error appears in the above-identified patent and that said Letters Patent is hereby corrected as shown below:

On the Title Page

Column 1 (Item (73) Assignee), Line 1, delete "Corporaton," and insert -- Corporation, --, therefor.

Signed and Sealed this  
Twenty-seventh Day of October, 2020

Andrei Iancu  
*Director of the United States Patent and Trademark Office*